J. L. G. Ward.
Composite Roof.

N° 23,051. Patented Feb. 22, 1859.

Witnesses

Inventor
J. L. G. Ward

UNITED STATES PATENT OFFICE.

J. L. G. WARD, OF ADRIAN, MICHIGAN.

CEMENTING ROOFS.

Specification of Letters Patent No. 23,051, dated February 22, 1859.

*To all whom it may concern:*

Be it known that I, J. L. G. WARD, of Adrian, in the county of Lenawee and State of Michigan, have invented a new and useful Improvement in Roofs; and I do hereby declare that the following is a full, clear, and exact description of the same, reference being had to the accompanying drawings, forming part of this specification, in which—

Figure 1:
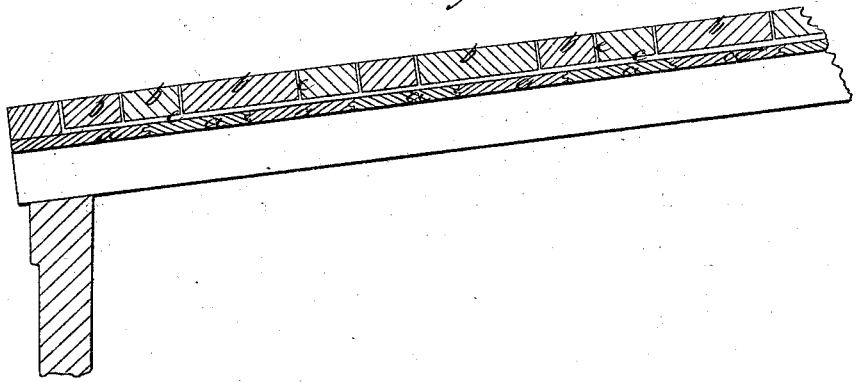
Figure 2:
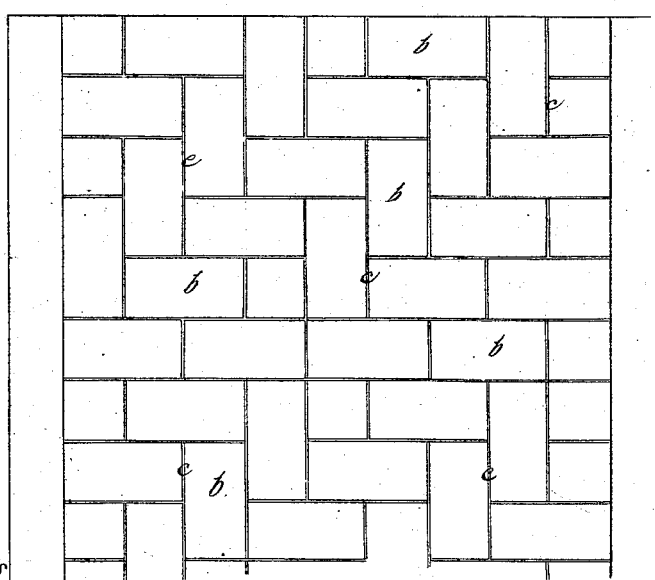

Figure 1 is a section of part of a roof having my invention applied. Fig. 2 is a plan of the same.

Similar letters of reference indicate corresponding parts in both of the figures.

This invention consists in the covering of roofs by laying bricks or tiles in a cement consisting of an alkaline silicate and subsequently treating the surface of such cement with acid which combines with the alkali of the cement and forms a salt which when washed away leaves a surface of pure silica which is impervious to water, thus producing a weather tight roof of a very durable character.

To enable others to put my invention in practice, I will proceed to describe its application.

The silicious cement which I employ is made by dissolving silex obtained in the form of sand, or in any form in which it exists in nature, in an aqueous solution of caustic potash or caustic soda, by any process known to chemists; its consistency being such that it may be spread freely with a trowel or implement of similar character. The roof to receive this cement should be first covered with boards $a, a$, fitted together, and the bricks or tiles $b, b$, to be used should be flat and square, or of such a form as to bed firmly on the boards and fit together so as to leave narrow parallel interstices between them. Before laying the bricks or tiles $b, b$, the boards $a, a$, have the silicious cement $c, c$, spread upon them in a layer of sufficient thickness to form a bed for the said bricks or tiles to rest upon, and to rise up in the interstices between the same; and after the bricks or tiles have been laid, those of the interstices between them which are not filled by the rising of the cement between them should be carefully filled up with a trowel. The cement may also be spread over the upper surface with the same cement. When the cement has dried by the evaporation of its water, the whole surface of the roof is to be washed over with dilute muriatic acid or sulfuric acid which, by combining with the soda or potash, forms a muriate or sulfate of soda or potassia which, being soluble in water, may be washed away by water applied to the surface for the purpose, or will be washed away by the first rain, and leave a surface of pure silica all over the cement; and this surface being insoluble in water is an efficient protection to the body of cement below and also to the roof.

I do not claim, broadly, the use of alkaline silicates applied as a protection to the walls or other parts of buildings, but

What I claim as my invention, and desire to secure by Letters Patent, is:—

The covering of roofs of buildings by laying bricks or tiles or slabs of other material in a bed of cement consisting of an alkaline silicate, and subsequently treating the surface of said cement with an acid which combines with the alkali thereof and leaves a surface of pure silica, substantially as herein described.

J. L. G. WARD.

Witnesses:
W. TUSCH,
W. HAUFF.